(12) United States Patent
Chun et al.

(10) Patent No.: US 8,005,115 B2
(45) Date of Patent: Aug. 23, 2011

(54) METHOD OF TRANSFERRING A DATA BLOCK IN A WIRELESS COMMUNICATION SYSTEM

(75) Inventors: Sung Duck Chun, Anyang-si (KR); Young Dae Lee, Anyang-si (KR); Sung Jun Park, Anyang-si (KR); Seung June Yi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/451,255

(22) PCT Filed: May 1, 2008

(86) PCT No.: PCT/KR2008/002482
§ 371 (c)(1),
(2), (4) Date: Jan. 7, 2010

(87) PCT Pub. No.: WO2008/136598
PCT Pub. Date: Nov. 13, 2008

(65) Prior Publication Data
US 2010/0118890 A1    May 13, 2010

Related U.S. Application Data

(60) Provisional application No. 60/915,917, filed on May 3, 2007.

(30) Foreign Application Priority Data

Apr. 30, 2008    (KR) .......................... 10-2008-0040615

(51) Int. Cl.
*H04J 3/24* (2006.01)
(52) U.S. Cl. ....................................... 370/474; 370/473

(58) Field of Classification Search .................. 370/230, 370/230.1, 231, 235, 349, 469, 471, 473, 370/474, 475
See application file for complete search history.

(56) References Cited

U.S. PATENT DOCUMENTS

| 6,157,833 A | 12/2000 | Lawson-Jenkins et al. |
| 6,324,171 B1 | 11/2001 | Lee et al. |

(Continued)

FOREIGN PATENT DOCUMENTS

EP    1 148 753    10/2001

(Continued)

OTHER PUBLICATIONS

Nokia, "Requirements for redirection in E-UTRAN", 3GPP TSG-RAN WG2 Meeting #56-bis, R2-070107, Jan. 2007.

(Continued)

*Primary Examiner* — Ricky Ngo
*Assistant Examiner* — Wei-Po Kao
(74) *Attorney, Agent, or Firm* — McKenna Long & Aldridge LLP (57) ABSTRACT

A method of data processing in a protocol layer of a wireless communication system, the protocol layer having a header compression function, comprises generating at least one of a control packet which includes control information, and a data packet including at least part of an upper layer data block transferred from an upper layer, generating a lower layer data block including each of the generated at least one packet to transfer the lower layer data block to a lower layer, and transferring indication information to the lower layer, the indication information being associated with a method of data processing for the lower layer data block in the lower layer.

12 Claims, 9 Drawing Sheets

U.S. PATENT DOCUMENTS

| | | |
|---|---|---|
| 6,353,628 B1 | 3/2002 | Wallace et al. |
| 6,526,027 B1 | 2/2003 | Yeom |
| 6,567,409 B1 | 5/2003 | Tozaki et al. |
| 6,725,267 B1 | 4/2004 | Hoang |
| 7,197,317 B2 | 3/2007 | Parkvall et al. |
| 7,245,707 B1 | 7/2007 | Chan |
| 7,551,643 B2 | 6/2009 | Yeo et al. |
| 2001/0017850 A1 | 8/2001 | Kalliokulju et al. |
| 2001/0044322 A1 | 11/2001 | Raaf |
| 2002/0024972 A1 | 2/2002 | Yi et al. |
| 2002/0028690 A1 | 3/2002 | McKenna et al. |
| 2002/0057663 A1 | 5/2002 | Lim |
| 2003/0007512 A1 | 1/2003 | Tourunen et al. |
| 2003/0123485 A1 | 7/2003 | Yi et al. |
| 2003/0165133 A1 | 9/2003 | Garani |
| 2003/0189922 A1 | 10/2003 | Howe |
| 2003/0207696 A1 | 11/2003 | Willenegger et al. |
| 2004/0014452 A1 | 1/2004 | Lim et al. |
| 2004/0028078 A1 | 2/2004 | Beckmann et al. |
| 2004/0117860 A1 | 6/2004 | Yi et al. |
| 2004/0121771 A1 | 6/2004 | Song et al. |
| 2004/0253959 A1 | 12/2004 | Hwang et al. |
| 2005/0041610 A1 | 2/2005 | Lee et al. |
| 2005/0041681 A1 | 2/2005 | Lee et al. |
| 2005/0085254 A1 | 4/2005 | Chuah et al. |
| 2005/0094670 A1* | 5/2005 | Kim ............................ 370/477 |
| 2005/0141462 A1 | 6/2005 | Aerrabotu et al. |
| 2005/0176474 A1 | 8/2005 | Lee et al. |
| 2005/0185620 A1 | 8/2005 | Lee et al. |
| 2005/0232271 A1 | 10/2005 | Kettunen et al. |
| 2005/0238051 A1* | 10/2005 | Yi et al. ...................... 370/469 |
| 2006/0067324 A1 | 3/2006 | Kim et al. |
| 2006/0067364 A1 | 3/2006 | Jung et al. |
| 2006/0087994 A1 | 4/2006 | Barth et al. |
| 2006/0126554 A1 | 6/2006 | Motegi et al. |
| 2006/0165045 A1 | 7/2006 | Kim et al. |
| 2006/0209870 A1 | 9/2006 | Lee et al. |
| 2006/0245417 A1* | 11/2006 | Conner et al. ............... 370/352 |
| 2007/0047582 A1 | 3/2007 | Malkamaki |
| 2007/0060139 A1 | 3/2007 | Kim et al. |
| 2007/0165567 A1 | 7/2007 | Tan et al. |
| 2007/0177569 A1 | 8/2007 | Lundby |
| 2007/0178875 A1 | 8/2007 | Rao et al. |
| 2007/0206531 A1 | 9/2007 | Pajukoski et al. |
| 2007/0248075 A1* | 10/2007 | Liu et al. ..................... 370/349 |
| 2007/0258591 A1* | 11/2007 | Terry et al. .................. 380/247 |
| 2007/0291673 A1 | 12/2007 | Demirhan et al. |
| 2007/0291719 A1 | 12/2007 | Demirhan et al. |
| 2007/0291728 A1 | 12/2007 | Dalsgaard et al. |
| 2007/0291729 A1 | 12/2007 | Dalsgaard et al. |
| 2008/0043619 A1* | 2/2008 | Sammour et al. ............ 370/231 |
| 2008/0056198 A1 | 3/2008 | Charpentier et al. |
| 2008/0056273 A1 | 3/2008 | Pelletier et al. |
| 2008/0101268 A1 | 5/2008 | Sammour et al. |
| 2008/0167089 A1 | 7/2008 | Suzuki et al. |
| 2008/0181127 A1 | 7/2008 | Terry et al. |
| 2008/0273610 A1 | 11/2008 | Malladi et al. |

FOREIGN PATENT DOCUMENTS

| | | |
|---|---|---|
| EP | 1 168 877 | 1/2002 |
| EP | 1 209 938 | 5/2002 |
| EP | 1 304 898 | 4/2003 |
| EP | 1 315 356 | 5/2003 |
| EP | 1 318 632 | 6/2003 |
| EP | 1337124 A2 | 8/2003 |
| EP | 1 372 310 | 12/2003 |
| EP | 1 420 551 | 5/2004 |
| EP | 1 501 328 | 1/2005 |
| EP | 1 511 245 | 3/2005 |
| EP | 1 720 373 | 11/2006 |
| EP | 1720322 A1 | 11/2006 |
| EP | 1932380 | 6/2008 |
| JP | 2002-539686 | 11/2002 |
| JP | 2003-504935 | 2/2003 |
| JP | 2005-354488 | 12/2005 |
| JP | 2006-505979 | 2/2006 |
| JP | 2006-067115 | 3/2006 |
| KR | 10-2001-0105240 | 11/2001 |
| KR | 10-2004-0039944 | 5/2004 |
| KR | 10-2004-0048675 | 6/2004 |
| KR | 10-2005-0008440 | 1/2005 |
| KR | 10-2005-0027972 | 3/2005 |
| KR | 10-2005-0096763 | 10/2005 |
| RU | 2249917 C2 | 4/2005 |
| WO | WO 00/74416 | 12/2000 |
| WO | WO 2004/043094 | 5/2004 |
| WO | WO 2004/064272 | 7/2004 |
| WO | WO 2005/048613 | 5/2005 |
| WO | WO 2006/049441 A1 | 5/2006 |
| WO | WO 2006/075820 A1 | 7/2006 |
| WO | WO 2006/104344 | 10/2006 |
| WO | WO 2006/109851 | 10/2006 |
| WO | WO 2007/025138 A2 | 3/2007 |
| WO | WO 2007/052888 | 5/2007 |
| WO | WO 2007/078155 | 7/2007 |
| WO | WO 2007/078172 | 7/2007 |
| WO | WO 2007/078929 A2 | 7/2007 |
| WO | WO 2007/133034 | 11/2007 |
| WO | WO 2008/111684 A1 | 9/2008 |
| WO | WO 2009/084998 | 7/2009 |

OTHER PUBLICATIONS

Panasonic, "MAC PDU format for LTE", 3GPP TSG RAN WG2 #56bis, R2-070096, Jan. 2007.

LG Electronics Inc., "Relative Buffer Status Reporting", 3GPP TSG RAN WG2 meeting #46bis, R2-050852, Apr. 2005.

Ipwireless, "Layer 2 functions for LTE", 3GPP TSG RAN WG2 #48bis, R2-052377, Oct. 2005.

Samsung Electronics Co., Ltd., "Selective forwarding/retransmission during HO.", 3GPP TSG-RAN2 Meeting #56 BIS, R2-070130, Jan. 2007.

Samsung Electronics Co., Ltd., "Re-use of PDCP SN at ARQ level", 3GPP-TSG-RAN2 Meeting #53 bis, R2-061829, Jun. 2006.

Ntt Docomo et al: "MAC PD U structure for LTE", 3GPP TSG RAN WG2 #56bis, R2-070280, Jan. 2007, XP050133369.

Catt et al: "Enhancement to Buffer Status Reporting", 3GPP TSG-RAN WG2 #57bis, R2-071345, Mar. 2007, XP050134291.

LG Electronics Inc: "PDCP retransmissions" 3GPP Draft; R2-073041 PDCP Retransmissions V2, Aug. 16, 2007, XP050135778.

LG Electronics Inc: "Contents of PDCP Status Report R2-07xxxx", 3GPP TSG-RAN WG2, 59, Oct. 8, 2007, pp. 1-3, XP002580785.

"PDCP Structure and Traffic Path" 3GPP Draft; R2-073259, Aug. 16, 2007, XP050135985.

Asustek: "Granularity Consideration for Variable RLC PDUsizes"; R2-070336, XP050133423, Jan. 12, 2007.

3GPP; "Technical Specification Group Radio Access Network"; Medium Access control (MAC) protocol specification (Release 7); XP050367709, Mar. 1, 2007.

Bosch: "Header Compression Signalling" 3GPP Draft; XP050114120, Nov. 29, 1999.

3GPP; "Packet Data Convergence Protocol (PDCP) Specification (Release 7)", 3GPP TS 25.323, XP050367856, Mar. 1, 2007.

Youjun Gao et al: "Research on the access network and MAC technique for beyond 3G systems" IEEE Wireless Communications, IEEE Service Center, Piscataway, NJ, US, vol. 14, No. 2, Apr. 1, 2007, pp. 57-61, XP011184637 ISSN: 1536-1284.

Alcatel-Lucent: "Downlink Control Signaling and Multiplexing for VOIP, R1-071721", 3$^{rd}$ Generation Partnership Project (3GPP) Technicalspecification Group (TSG) Radio Access Network (RAN); Workinggroup 1 (WG1), no. 48bis, Mar. 26, 2007, pp. 1-4, XP002460800.

Nokia Corporation, Nokia Siemens Networks: "MAC Header Format, R2-073891", #GPP TSG-RAN WG2 meeting 59bis, Oct. 1, 2007, XP002602993.

LG Electronics Inc.: "Support for VOIP Over MAC-hs/ehs", 3GPP Draft; R2-071542 Support for VOIP Over MAC-HS, 3$^{rd}$ Generation Partnership Project (3GPP), Mobile Competence Centre; vol. RAN WG2, no. St. Julian; 20070402, Apr. 2, 2007, XP050134474.

LG Electronics: "UL Timing Control related to Contention Resolution", 3GPP TSG-RAN WG2 #61 bis, Shenzhen, China, Mar. 31-Apr. 4, 2008, R2-081607, XP050139334.

3rd Generation Partnership Project: Evolved Universal Terrestrial Radio Access (E-UTRA) Medium Access Control (MAC) protocol specification (Release 8), Technical Specification Group Radio Access Network, Mar. 1, 2008, XP050377617.

Sammour et al., U.S. Appl. No. 60/863,185, filed Oct. 27, 2006.

* cited by examiner

METHOD OF TRANSFERRING A DATA BLOCK IN A WIRELESS COMMUNICATION SYSTEM

This application claims the benefit of PCT/KR2008/002482, filed on May 1, 2008, along with U.S. Provisional Application Ser. No. 60/915,917 filed May 3, 2007 and Korean Patent Application No. 10-2008-0040615, filed Apr. 30, 2008, all of which are hereby incorporated herein by reference for all purposes in their entireties

TECHNICAL FIELD

The present invention relates to a wireless communication system, and more particularly, to a method of data processing in a wireless communication system.

BACKGROUND ART

Figure 1:
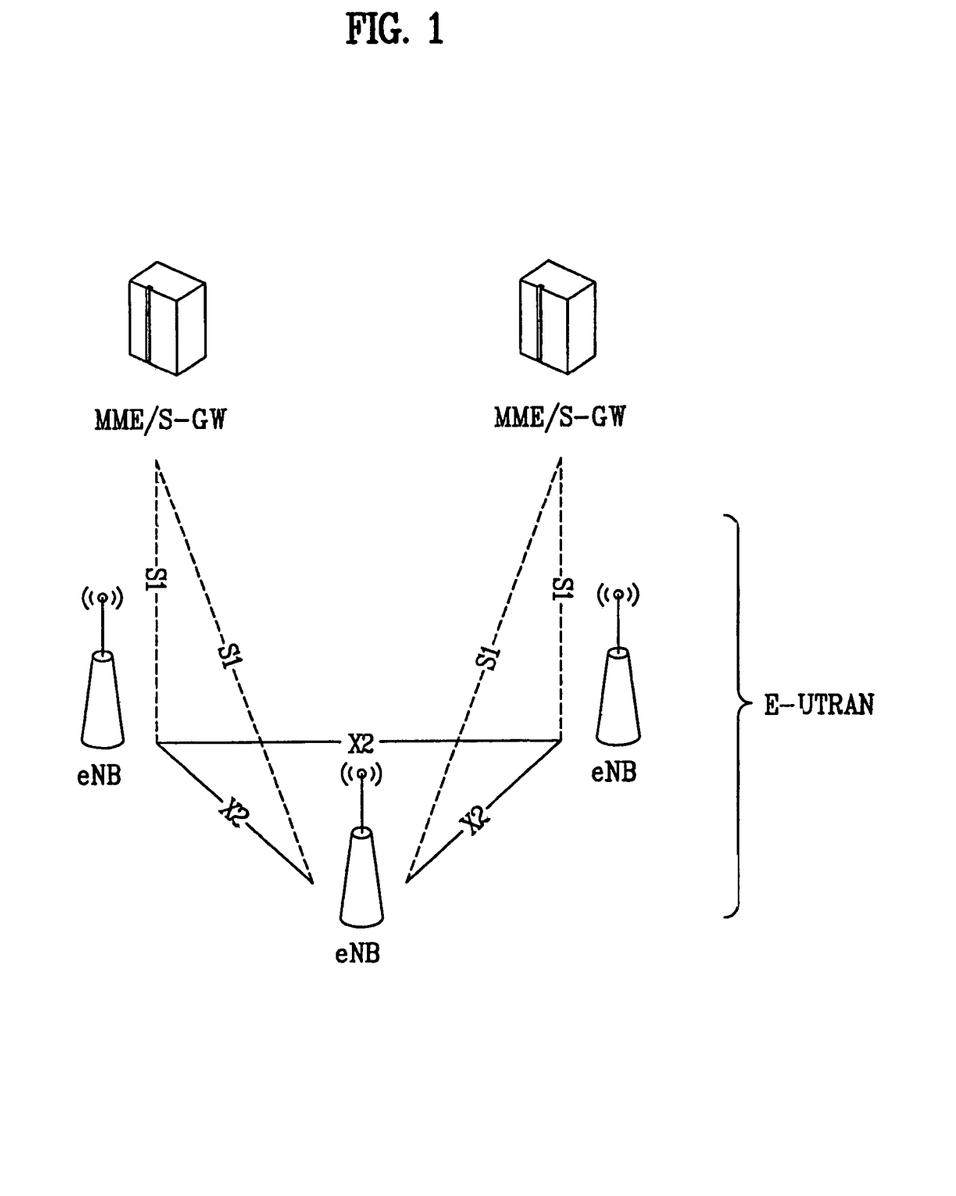
FIG. 1 is a diagram illustrating a network structure of an E-UMTS (Evolved-Universal Mobile Telecommunications System)

FIG. 1 is a diagram illustrating a network structure of an E-UMTS (Evolved-Universal Mobile Telecommunications System). An E-UMTS is a system evolving from the conventional WCDMA (wideband code division multiple access) UMTS and its basic standardization is currently handled by the 3GPP (3$^{rd}$ Generation Partnership Project). The E-UMTS can also be called an LTE (Long Term Evolution) system.

Referring to FIG. 1, an E-UTRAN (UMTS terrestrial radio access network) includes base stations (hereinafter, referred to as 'eNode B' or 'eNB'), wherein the respective eNBs are connected with each other through X2 interface. Also, each of eNBs is connected with a user equipment (UE) through a radio interface and connected with an EPC (Evolved Packet Core) through S1 interface. The EPC includes MME/SAE gateway (Mobility Management Entity/System Architecture Evolution gateway).

Layers of a radio interface protocol between a UE and a network can be classified into a first layer L1, a second layer L2 and a third layer L3 based on three lower layers of OSI (open system interconnection) standard model widely known in communication systems. A physical layer belonging to the first layer L1 provides an information transfer service using a physical channel. A radio resource control (hereinafter, abbreviated as 'RRC') layer located at the third layer plays a role in controlling radio resources between the UE and the network. For this, the RRC layer enables RRC messages to be exchanged between the UE and the network. The RRC layer may distributively be located at network nodes including Node B, an AG and the like, or may independently be located at either the Node B or the AG.

Figure 2:
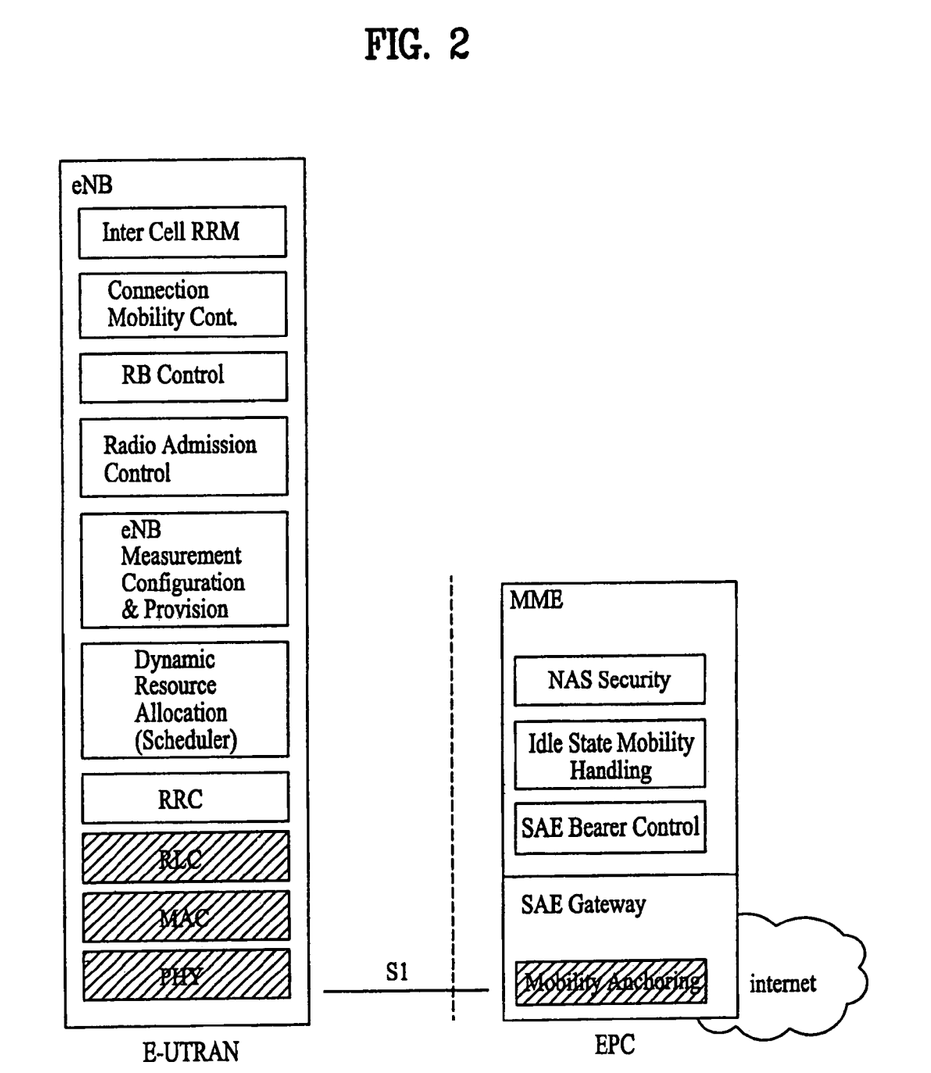
FIG. 2 is a schematic view illustrating an E-UTRAN (UMTS terrestrial radio access network)

FIG. 2 is a schematic view illustrating an E-UTRAN (UMTS terrestrial radio access network). In FIG. 2, a hatching part represents functional entities of a user plane and a non-hatching part represents functional entities of a control plane.

Figure 3A:
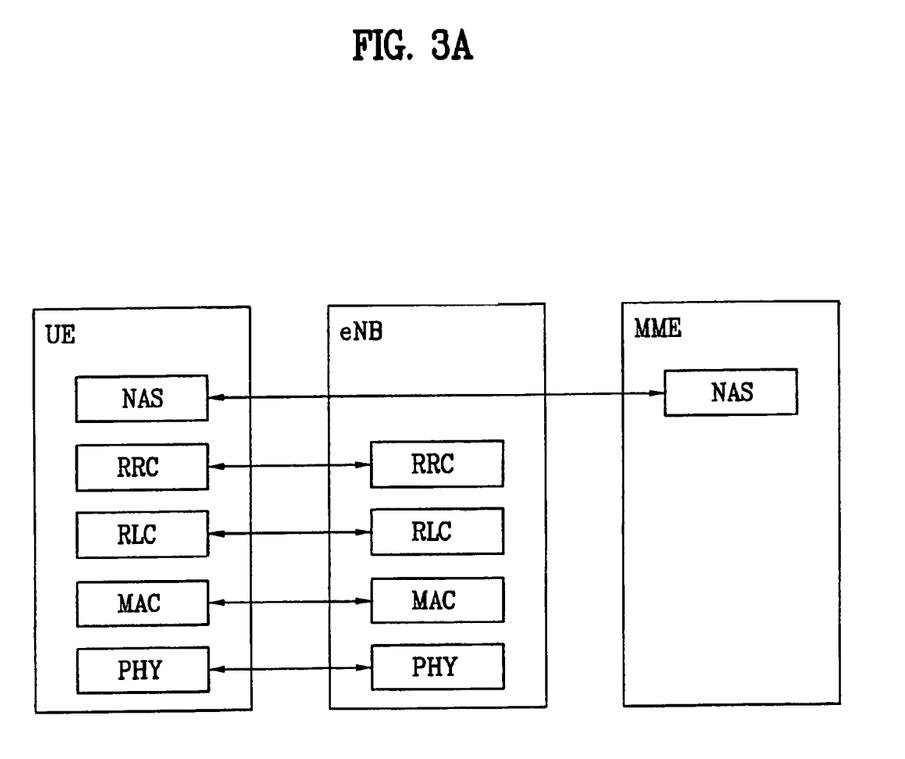
FIG. 3A is a schematic view of a control plane protocol and FIG. 3B is a schematic view of a user plane protocol.
Figure 3B:
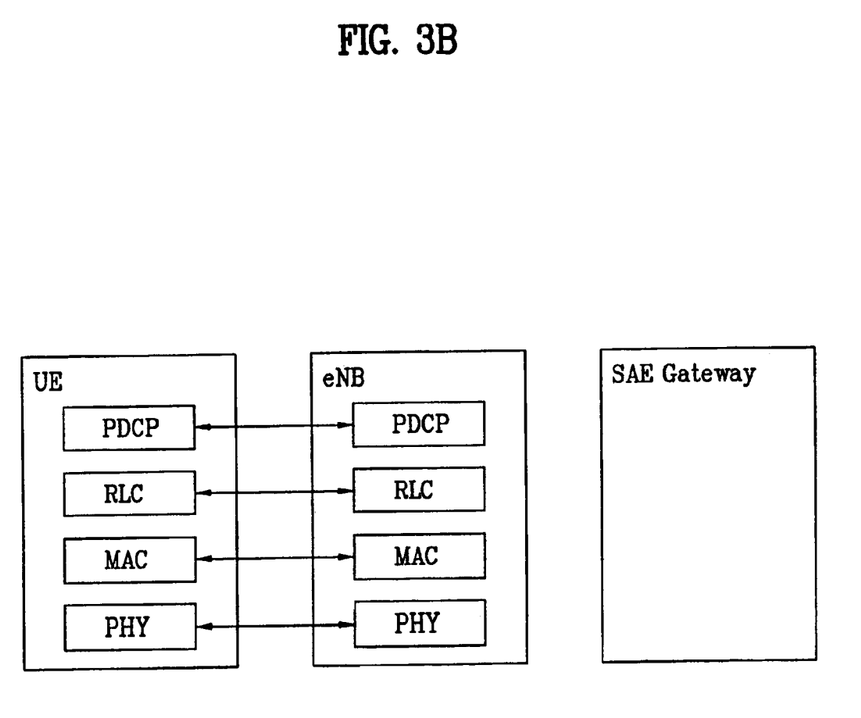

FIG. 3A and FIG. 3B are diagrams illustrating a structure of a radio interface protocol between the user equipment (UE) and the E-UTRAN, in which FIG. 3A is a schematic view of a control plane protocol and FIG. 3B is a schematic view of a user plane protocol. Referring to FIG. 3A and FIG. 3B, a radio interface protocol horizontally includes a physical layer, a data link layer, and a network layer and vertically includes a user plane for data information transfer and a control plane for signaling transfer. The protocol layers in FIG. 3A and FIG. 3B can be classified into L1 (first layer), L2 (second layer), and L3 (third layer) based on three lower layers of the open system interconnection (OSI) standard model widely known in the communications systems.

The physical layer as the first layer provides information transfer service to an upper layer using physical channels. The physical layer is connected to a medium access control (hereinafter, abbreviated as 'MAC') layer above the physical layer via a transport channel. Data are transferred between the medium access control layer and the physical layer via the transport channel. Moreover, data are transferred between different physical layers, and more particularly, between one physical layer of a transmitting side and the other physical layer of a receiving side via the physical channel. The physical channel of the E-UMTS is modulated according to an orthogonal frequency division multiplexing (OFDM) scheme, and time and frequency are used as radio resources.

The medium access control (hereinafter, abbreviated as 'MAC') layer of the second layer provides a service to a radio link control (hereinafter, abbreviated as 'RLC') layer above the MAC layer via a logical channel. The RLC layer of the second layer supports reliable data transfer. In order to effectively transmit IP packets (e.g., IPv4 or IPv6) within a radio-communication period having a relatively narrow bandwidth, a PDCP layer of the second layer (L2) performs header compression to reduce unnecessary control information.

A radio resource control (hereinafter, abbreviated as 'RRC') layer located on a lowest part of the third layer is defined in the control plane only and is associated with configuration, reconfiguration and release of radio bearers (hereinafter, abbreviated as 'RBs') to be in charge of controlling the logical, transport and physical channels. In this case, the RB means a service provided by the second layer for the data transfer between the UE and the UTRAN.

Hereinafter, the PDCP layer included in the second layer will be described.

The PDCP layer is connected with its upper layer, i.e., RRC layer or a user application layer, and is connected with its lower layer, i.e., RLC layer. Main functions carried out by the PDCP layer include a header compression function and a security function. The header compression function is used to enhance use efficiency of radio resources, and is advantageous in that the quantity of information to be transmitted from a radio terminal is decreased using common features of packets transmitted through a single Internet packet stream. Examples of the security function include ciphering and integrity check, and the security function is used to prevent data manipulation or monitoring by the third party from occurring.

Of a header compression scheme used in the PDCP layer, a robust header compression (ROHC) scheme is used to reduce header information of RTP (Real-time Transport Protocol)/UDP (User Datagram Protocol)/IP (Internet Protocol) packets. In addition to the ROCH scheme, another example of the header compression scheme includes RFC2507.

The ROHC scheme is based on the fact that field values of packet headers in continuous packets belonging to one packet stream are almost constant. Accordingly, the ROHC scheme transmits a variable field not all the fields included in the packet headers. For reference, the entire header size of RTP/UDP/IP packets which are not compressed is 40 octet in case of IPv4 (IP version 4) and 60 octet in case of IPv6 (IP version 6) while size of a pure data part called payload is generally 15~20 octet. Accordingly, it is noted that transmission efficiency is very low as control information has a structure greater than that of user data to be actually transmitted. In this respect, if the header compression scheme is used, the quantity of control information can be reduced remarkably. For example, size of the header reduced by the ROHC scheme is only 1 octet to 3 octets.

The ROHC scheme is divided into a uni-directional mode (hereinafter, abbreviated as 'U-mode'), a bi-directional optimistic mode (hereinafter, abbreviated as 'O-mode') and a bi-directional reliable mode (hereinafter, abbreviated as 'R-mode'). In case of the U-mode, the transmitting side performs uni-directional communication to the receiving side. In case of the O-mode or R-mode, the transmitting side performs bi-directional communication to transmit real-time packets and the receiving side transmits transmission status information to the transmitting side. Therefore, according to the ROHC scheme of the O-mode and the R-mode, the transmitting side transmits header compression packets of data and controls transmission of real-time traffic packets in response to ROHC status information (ACK or NACK) received from the receiving side. A use purpose of the ROHC status information transferred from the receiving side to the transmitting side may depend on the mode. The ROHC scheme of the O-mode increases compression efficiency by mainly transmitting NACK related information, and the ROHC scheme of the R-mode supports robuster header compression scheme by using strict logic based on the ROHC status information. The ROHC status information can be called feedback information in a header compression procedure. In addition to the ROHC scheme, feedback information is also used in another header compression scheme.

Among the modes of the ROCH scheme, the U-mode will be described in detail. A compressor has three statuses, i.e., an entire context forming status, a dynamic context forming status, and an entire context perfect status. A type of a compression header packet is varied depending on each status, and its operation method is also varied depending on each status. First of all, a structure of a context will be described. The structure of a context includes a static context and a dynamic context.

Figure 4:
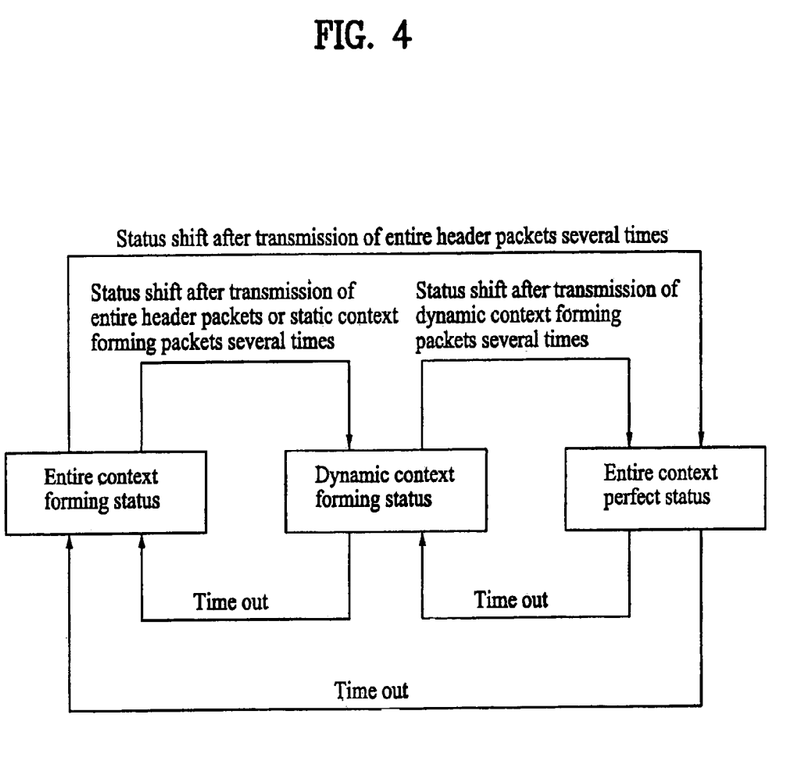
FIG. 4 is a diagram illustrating a status of an ROHC U-mode compressor according to the related art and its shift procedure.

FIG. 4 is a diagram illustrating a status of an ROHC U-mode compressor according to the related art and its shift procedure. Referring to FIG. 4, the entire context forming status means that the entire context has not been formed at all, or the entire context should be reconstructed due to its damage. The dynamic context forming status means that a dynamic context part of the entire context should be reconstructed due to its damage. The entire context perfect status means that the entire context is in a perfect status without damage. Each status is shifted to another status per period. At this time, the respective periods are different from one another. For example, a shift period from the entire context perfect status to the dynamic context forming status is much greater than that from the entire context perfect status to the entire context forming status.

DISCLOSURE OF THE INVENTION

A data block generated in the aforementioned PDCP layer according to the related art can be divided into various types depending on whether data included in the data block are transferred from an upper layer or generated directly in the PDCP layer. Also, the data block generated in the PDCP layer can be divided into various types depending on whether data transferred from an upper layer are user data or control data. Meanwhile, a lower layer which carries out data processing for each data block transferred from the PDCP layer needs to carry out data processing differently depending on a type of each data block generated in the PDCP layer. Accordingly, for efficiency of data processing in view of the lower layer, a method of identifying a type or feature of data blocks transferred from the PDCP layer is required.

Accordingly, an object of the present invention is to provide a method of processing data efficiently in a wireless communication system, which substantially obviates one or more problems due to limitations and disadvantages of the related art.

To achieve these objects and other advantages and in accordance with the purpose of the invention, as embodied and broadly described herein, a method of data processing in a protocol layer of a wireless communication system, the protocol layer having a header compression function, comprises generating at least one of a control packet which includes control information and a data packet including at least part of an upper layer data block transferred from an upper layer, generating a lower layer data block including each of the generated at least one packet to transfer the lower layer data block to a lower layer, and transferring indication information to the lower layer, the indication information being associated with a method of data processing for the lower layer data block in the lower layer.

In another aspect of the present invention, a method of data processing in a protocol layer of a transmitting side in a wireless communication system comprises receiving an upper layer data block from an upper layer, the upper layer data block including a control packet which includes control information, and a compression packet for which header compression has been carried out, receiving indication information from the upper layer, the indication information being related with a method of data processing for the upper layer data block, and performing data processing for the upper layer data block in accordance with the indication information.

BRIEF DESCRIPTION OF THE DRAWINGS

FIG. 3A and FIG. 3B are diagrams illustrating a structure of a radio interface protocol between a user equipment (UE) and E-UTRAN, in which

BEST MODE FOR CARRYING OUT THE INVENTION

Hereinafter, structures, operations, and other features of the present invention will be understood readily by the preferred embodiments of the present invention, examples of which are illustrated in the accompanying drawings.

Figure 5:
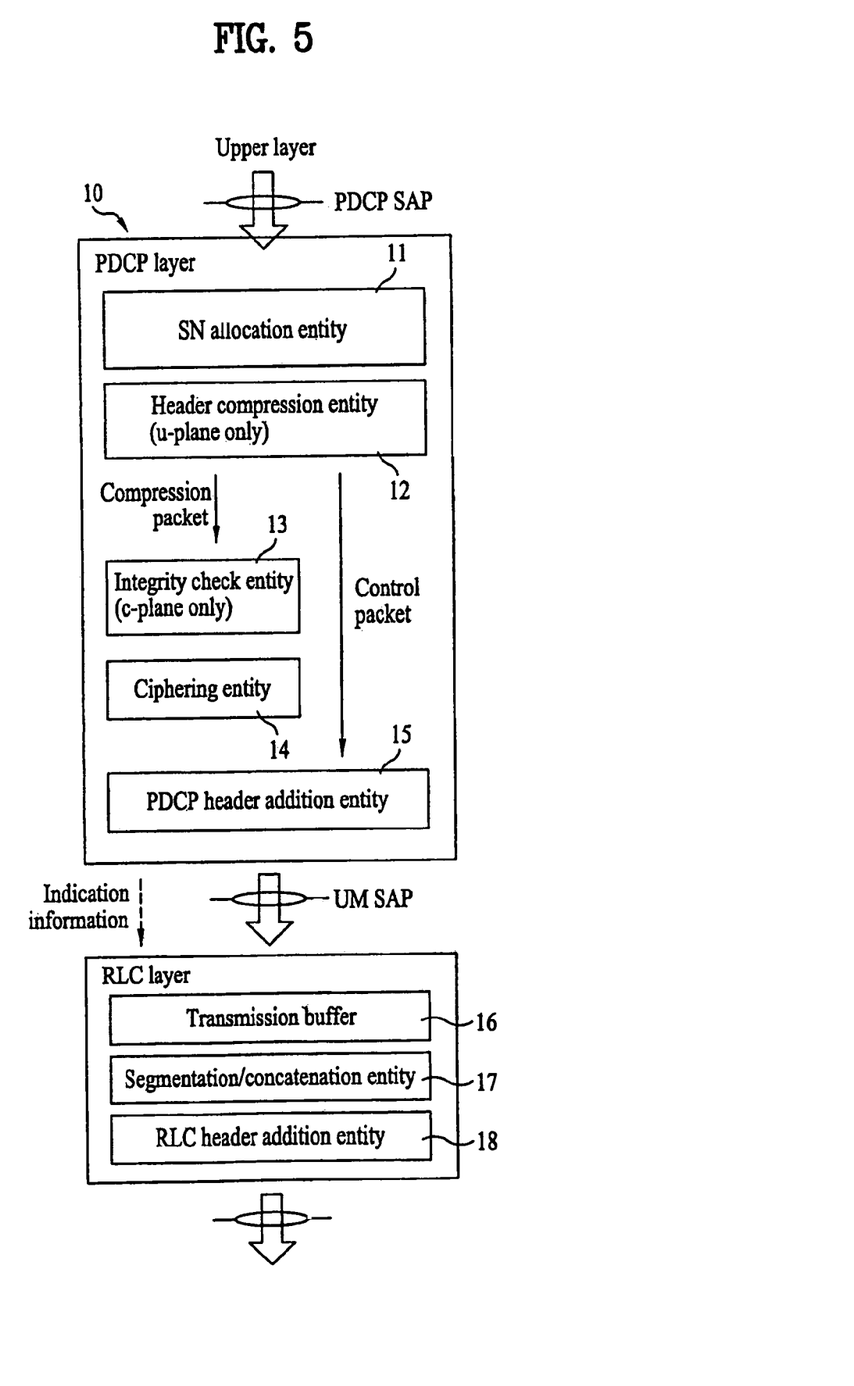
FIG. 5 is a diagram illustrating functional entities included in PDCP layer and RLC layers of a transmitting side in E-UMTS.

FIG. 5 is a diagram illustrating functional entities included in PDCP layer and RLC layer of a transmitting side in E-UMTS. Although one entity corresponding to each function performed by the PDCP layer and RLC layer is illustrated in FIG. 5, two or more entities may be combined to constitute one entity.

Referring to FIG. 5, the PDCP layer receives upper layer data, i.e., PDCP SDU (Service Data Unit) from an upper layer such as an RRC layer or an application layer. The upper layer data transferred from the RRC layer is signaling information of a control plane for carrying out a function of the RRC layer, and the upper layer data transferred from the application layer is data of a user plane.

A sequence number (SN) allocation entity 11 allocates a sequence number (SN) to the PDCP SDU transferred from the upper layer. A header compression entity 12 carries out a header compression function for the data of the user plane, i.e., the PDCP SDU, which are transferred from the upper layer. As described above, the header compression entity 12 can use an ROHC scheme as a compression scheme, and configures a header which includes a part not the entire of a field included in a header of a packet based on the fact that field values of respective packet headers are almost constant in continuous packets belonging to one packet stream. However, the header compression entity 12 does not carry out header compression for all PDCP SDUs, and periodically or non-periodically transmits full headers to a receiving side, wherein the full headers are not compressed. The receiving side reconstructs compressed headers based on the received full headers. The header compression function is not applied to the upper layer data transferred from the RRC layer.

Meanwhile, the header compression entity 12 generates a control packet which is not related with the PDCP SDU transferred from the upper layer, i.e., which does not include upper layer data. The control packet is related with carrying out the function of the PDCP layer, and includes control information generated by the header compression entity. An example of the control information includes feedback information or status information for the PDCP PDU received from the receiving side. The feedback information includes information related with header compression of the PDCP PDU received from the receiving side. The status information can include information as to whether the PDCP PDU received from the receiving side has been successfully received or whether retransmission is required. The control information can include other control information in addition to the feedback information or the status information.

Figure 6:
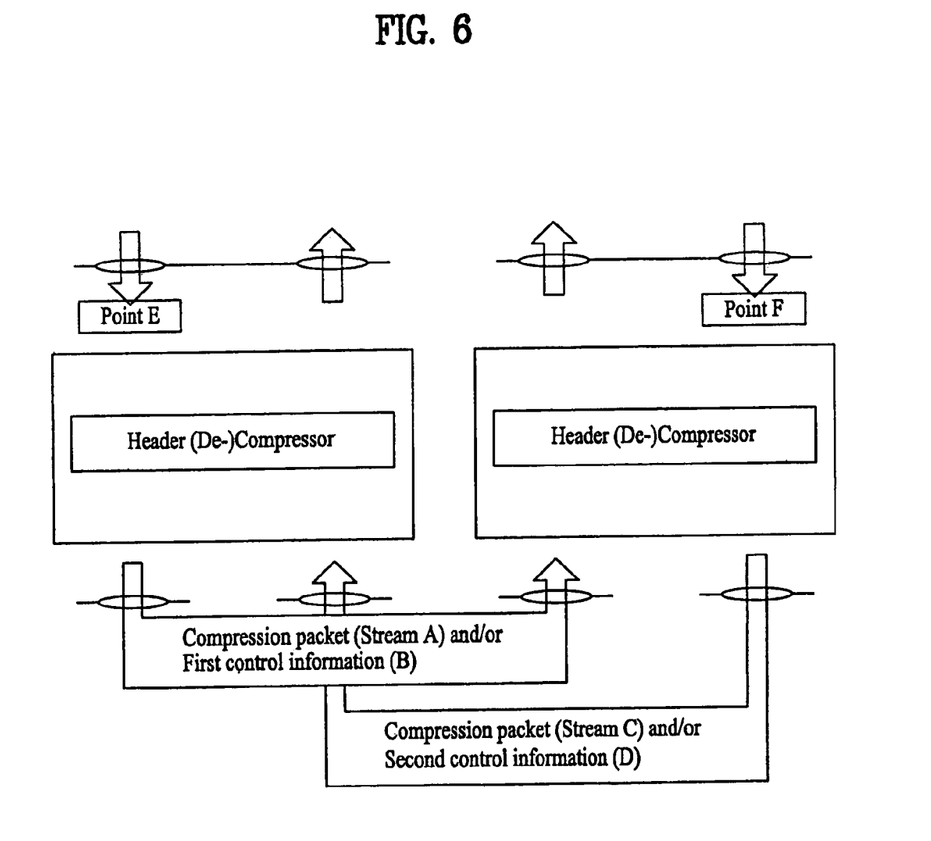
FIG. 6 is a diagram illustrating a procedure of transferring control information generated in a header compression entity of FIG. 5 to a receiving side.

FIG. 6 is a diagram illustrating a procedure of transferring control information generated in the header compression entity 12 to the receiving side.

Referring to FIG. 6, first control information B is transmitted from the left to the right, and means response information of compression packet streams, i.e., 'Stream C,' which are transmitted from the right to the left, such as feedback information or status information. Second control information D is transmitted from the right to the left, and means response information of compression packet streams, i.e., 'Stream A,' which are transmitted from the left to the right. In other words, although 'Stream A' is a stream of packets of PDCP SDUs which are transferred through 'Point E' and then compressed, the first control information B transferred in the same direction has no relation with the PDCP SDUs transferred through 'Point E' and is related with a stream of packets transferred to the PDCP layer through 'Point F' and connected to 'Stream C.' In other words, the first control information and the second control information are related with management of context information. Accordingly, the control information is information generated regardless of PDCP SDUs transferred from the upper layer in view of the PDCP layer of the transmitting side. In this case, a sequence number is not allocated by the SN allocation entity.

Referring to FIG. 5 again, an integrity check entity 13 carries out integrity protection for the PDCP SDUs, which include control plane data, i.e., the PDCP SDUs transferred from the RRC layer. The integrity check can be carried out in such a manner that a field called MAC-I (Message Authentication Code for Integrity Protection) is affixed to PDCP PDU which will be transmitted.

A ciphering entity 14 carries out ciphering for a compression packet and RRC message, wherein the compression packet has undergone header compression by the header compression entity 12 and the RRC message has undergone integrity protection by the integrity check entity 13. Data (PLAINTEXT BLOCK) is ciphered through bit operation between ciphering parameters and MASK generated by a specific ciphering algorithm to form CIPHERTEXT BLOCK. The CIPHERTEXT BLOCK is transmitted to the receiving side through a radio period, and the receiving side which has received the CIPHERTEXT BLOCK generates the same MASK through the ciphering algorithm used at the transmitting side to recover the original PLAINTEXT BLOCK. In addition to f8 algorithm used in 3GPP, various algorithms according to the related art can be used as the ciphering algorithm. The ciphering parameters mean CK, COUNT-C, BEARER, DIRECTION, LENGTH, etc, wherein COUNT-C is related with the sequence number of the PDCP SDU where ciphering is carried out, and is varied depending on time. In FIG. 5, the control packet to which the sequence number is not allocated is are not ciphered.

A PDCP header addition entity 15 generates PDCP PDU by adding PDCP header to the data block transferred from the header compression entity 12 or the ciphering entity 14. The PDCP PDU can be divided into three types. The first type is a PDCP PDU which includes upper layer data of the control plane, wherein the upper layer data is transferred from the RRC layer. The second type is a PDCP PDU which includes upper layer data of the user plane, wherein the upper layer data is transferred from the application layer which is the upper layer. The third type is a PDCP PDU which includes the control packet generated by the header compression entity 12. As illustrated in FIG. 5, since ciphering is carried out by the ciphering entity 14 before header addition, ciphering is not carried out in the header of the PDCP PDU regardless of the type of the PDCP PDU.

Figure 7:
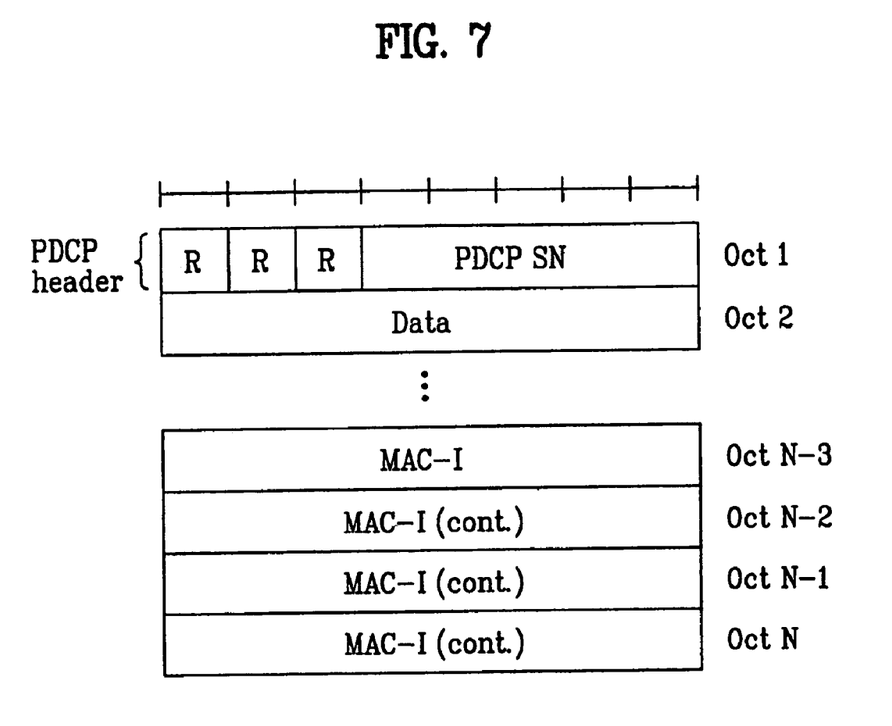
FIG. 7 is a diagram illustrating an example of a data format of PDCP PDU which includes upper layer data of a control plane.

FIG. 7 is a diagram illustrating an example of a data format of the PDCP PDU which includes the upper layer data of the control plane. As described above, after the sequence number is allocated by the SN allocation entity 11 of FIG. 5 to the upper layer data of the control plane, i.e., the control information transferred from the RRC layer, integrity protection is carried out for the control information by the integrity check entity 13. Accordingly, the header of the PDCP PDU illustrated in FIG. 7 includes PDCP SN field which includes a sequence number. 'R' field means a reserved bit. MAC-I field includes a message authentication code added for integrity protection by the integrity check entity 13.

Figure 8:
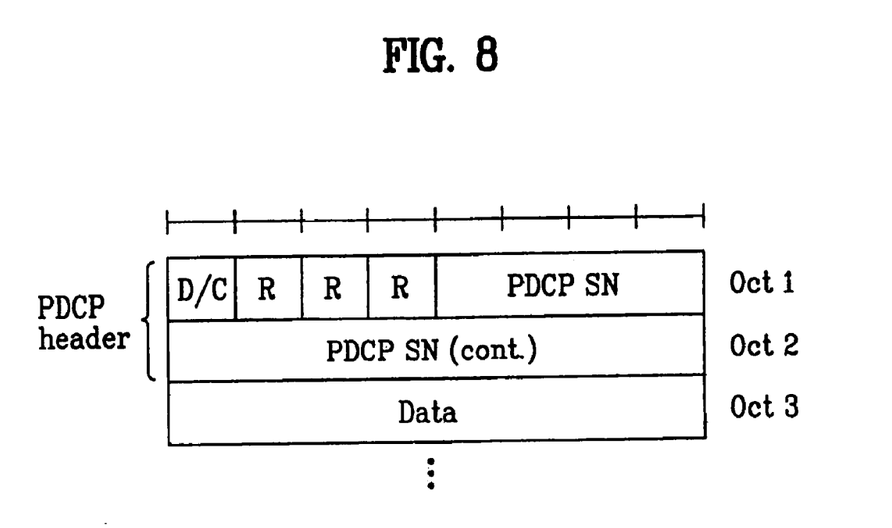
FIG. 8 is a diagram illustrating an example of a data format of PDCP PDU which includes upper layer data of a user plane.

FIG. 8 is a diagram illustrating an example of a data format of the PDCP PDU which includes the upper layer data of the user plane. The header of the PDCP PDU illustrated in FIG. 8 includes a D/C field and a PDCP SN field. The D/C field includes information indicating whether a corresponding PDCP PDU includes user data or control information. In FIG.

8, the D/C field includes an indicator which indicates that a corresponding PDCP PDU includes user data.

Figure 9A:
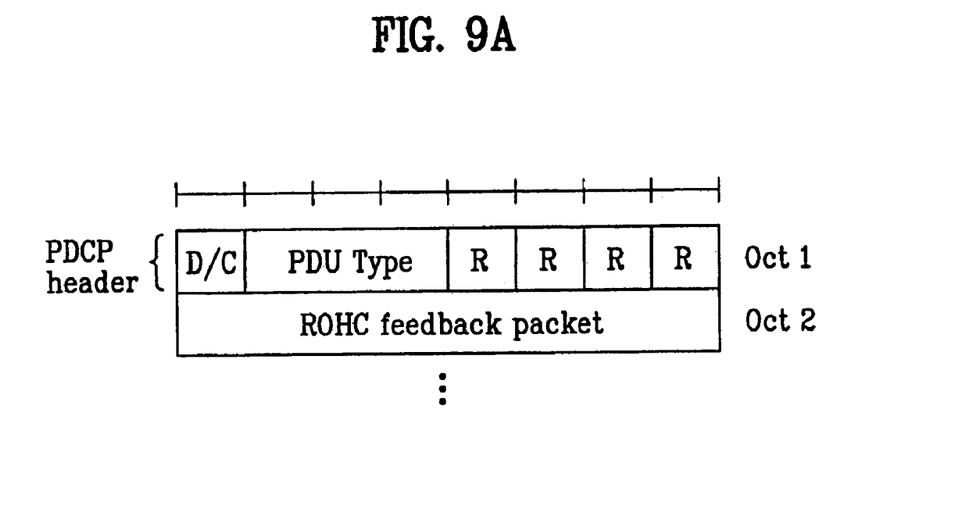
FIG. 9A and FIG. 9B are diagrams illustrating examples of data formats of PDCP PDUs which include control information generated in a PDCP layer not an upper layer.
Figure 9B:
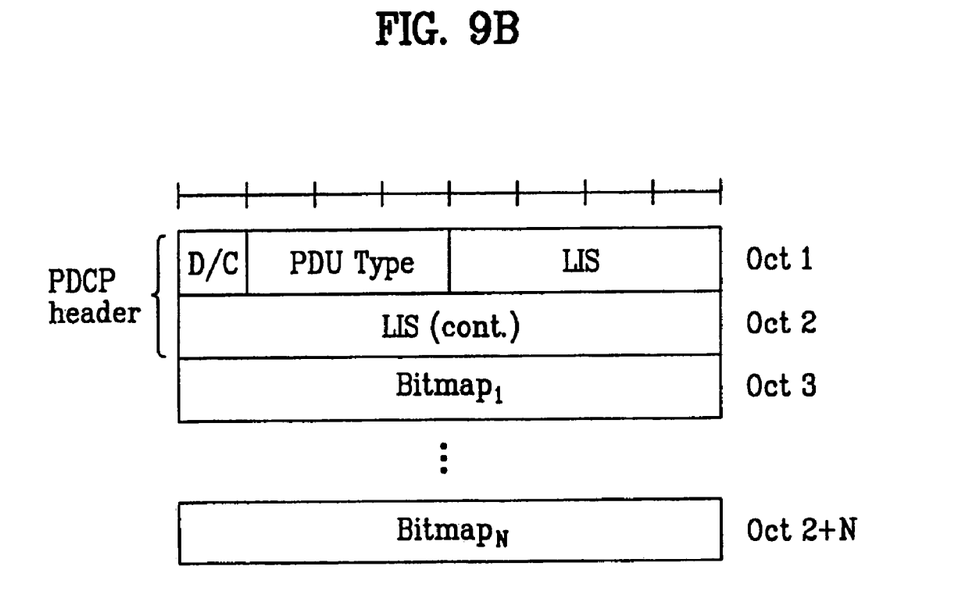

FIG. 9A and FIG. 9B are diagrams illustrating examples of data formats of PDCP PDUs which include control information generated in the PDCP layer not an upper layer, wherein the PDCP PDUs include different types of control information. The PDCP PDUs illustrated in FIG. 9A and FIG. 9B include a D/C field and a PDU type field in common. The D/C field includes an indicator which indicates that a corresponding PDCP PDU includes control information. The PDU type field includes information indicating a type of control information included in the corresponding PDCP PDU. Since FIG. 9A and FIG. 9B include different types of control information, the respective PDU Type fields include different types of information. Accordingly, the receiving side can identify what type of control information is included in the corresponding PDCP PDU, by using the information included in the PDU Type field.

The control information included in the PDCP PDU of FIG. 9A corresponds to an interspersed ROHC feedback packet. The interspersed ROHC feedback packet is generated by the header compression entity of FIG. 5, have no relation with the PDCP SDU transferred from the upper layer, and include feedback information of the PDCP PDU received from the receiving side. The information included in the PDCP PDU of FIG. 9B is status report information, and includes information indicating whether a plurality of PDCP PDUs received from the receiving side have been successfully received. For example, the status report information can include information as to whether the plurality of PDCP PDUs received from the receiving side have been successfully received, in a bit map type. In addition to the control information included in the PDCP PDUs illustrated in FIG. 9A and FIG. 9B, if there exists another type of control information generated in the PDCP PDU layer, PDCP PDU which includes such another type of control information can be configured. The PDU Type field included in the header of the corresponding PDCP PDU includes information different from the PDU Type field included in the PDCP PDUs of FIG. 9A and FIG. 9B, so that the PDU Type fields can be identified from each other. An example of another type of control information generated in the PDCP layer includes status report information for reporting reception acknowledgement information of PDCP SDUs after carrying out handover.

Referring to FIG. 5 again, each PDCP PDU generated in the PDCP layer is transferred to the RLC layer which is a lower layer. Also, the PDCP layer transfers indication information to the RLC layer, wherein the indication information is related with a method of data processing in the RLC layer of each PDCP PDU. The indication information can be included in a specific primitive used for information exchange between the PDCP layer and the RLC layer and then can be transferred from the PDCP layer to the RLC layer. Meanwhile, the indication information can be included in a corresponding PDCP PDU, for example, a specific field of a header of the corresponding PDCP PDU, and then can be transferred from the PDCP layer to the RLC layer.

The indication information is information related with the method of data processing in the RLC layer of each PDCP PDU, and can include at least one of segmentation information indicating whether the corresponding PDCP PDU can be segmented in the RLC layer and then can included in different data blocks, i.e., RLC PDUs, connection information indicating whether the corresponding PDCP PDU can be concatenated with another PDCP PDU in the RLC layer and then can be included in one RLC PDU, information indicating whether the corresponding PDCP PDU includes a control packet or a compression packet, type information indicating a type of the corresponding PDCP PDU, and transfer information indicating whether the corresponding PDCP PDU is emergency data or non-emergency data.

In FIG. 5, the RLC layer carries out data processing according to the indication information for at least one PDCP PDU (RLC SDU) transferred from the PDCP layer. The RLC layer can be divided into three modes. The first mode is a transparent mode (TM). This TM RLC entity serves to transfer the RLC SDU transferred from the PDCP layer to the lower layer without separate data processing. The second mode is an unacknowledged mode (UM). This UM RLC entity serves to segment/concatenate RLC SDU and generate RLC PDU through header addition. The third mode is an acknowledged mode (AM). This AM RLC entity serves to carry out functions related with retransmission of RLC SDU in addition to the functions of the UM mode. The RLC layer illustrated in FIG. 5 is an example of a configuration of the UM RLC entity.

In FIG. 5, a transmission buffer 16 stores PDCP PDUs (RLC SDUs) transferred from the PDCP layer. A segmentation/concatenation entity 17 carries out segmentation for the RLC SDU output from the transmission buffer 16, or carries out concatenation for the RLC SDU output from the transmission buffer 16 with two or more RLC SDUs, as occasion demands. An RLC header addition entity 18 adds an RLC header to the RLC SDU segmented or concatenated by the segmentation/concatenation entity 17 to generate RLC PDU. The generated RLC PDU is transferred to the lower layer. The TM RLC entity includes a transmission buffer only, and the AM RLC entity additionally includes a retransmission entity and RLC control entity in addition to elements of the UM RLC entity.

Hereinafter, detailed methods of carrying out data processing for PDCP PDU in accordance with indication information transferred from the PDCP layer to the RLC layer will be described.

If the indication information includes segmentation information indicating that the PDCP PDU transferred from the PDCP layer can be divided, the segmentation/concatenation entity 17 of the RLC layer divides the corresponding PDCP PDU into two or more. The RLC header addition entity 18 adds RLC header to each of the divided parts to generate RLC PDU. If the indication information includes segmentation information indicating that the PDCP PDU transferred from the PDCP layer cannot be divided, the RLC layer does not divide the corresponding PDCP PDU.

If the indication information includes concatenation information indicating that the PDCP PDU transferred from the PDCP layer can be concatenated with another PDCP PDU in the RLC layer and can be included in one RLC PDU, the segmentation/concatenation entity 17 of the RLC layer concatenates the corresponding PDCP PDU with at least one PDCP PDU, and the RLC header addition entity 18 adds a header to the concatenated PDCP PDUs to generate one RLC PDU. If the indication information includes concatenation information indicating that the PDCP PDU transferred from the PDCP layer fails to be concatenated with another PDCP PDU in the RLC layer and be included in one RLC PDU, the RLC layer does not concatenate the corresponding PDCP PDU with another PDCP PDU and generates RLC PDU including the corresponding PDCP PDU. In this case, if there is a space in the corresponding RLC PDU, the space can be filled with padding.

In determining whether to segment or concatenate a specific PDCP PDU, a type of the corresponding PDCP PDU can be considered. For example, if the corresponding PDCP PDU includes a compression packet, it can be segmented or can be concatenated with another PDCP PDU which includes a compression packet. Also, if the corresponding PDCP PDU includes a control packet or other control information, it can be included in one RLC PDU without being segmented or concatenated with another PDCP PDU. If two or more PDCP PDUs which include a compression packet are concatenated with each other and then are included in one RLC PDU, other sequence numbers of PDCP PDU except for a sequence number (SN) included in a header of one PDCP PDU can be omitted. Meanwhile, according to the related art, a separate sequence number is added to a header of the RLC PDU. In this case, since a sequence number is also included in a header of PDCP PDU included in the corresponding RLC PDU, a sequence number corresponding to the header of the RLC PDU can be omitted.

If the indication information indicates whether the PDCP PDU transferred from the PDCP layer includes a control packet or a compression packet or indicates type information indicating a type of the corresponding PDCP PDU, the RLC layer carries out a data process procedure previously set for the corresponding PDCP PDU in accordance with the type of the corresponding PDCP PDU. For example, the PDCP PDU which includes control information or a control packet can be set so as not to carry out segmentation or concatenation, and the PDCP PDU which includes a compression packet can be set to carry out segmentation or concatenation if necessary. For another example, the PDCP PDU which includes control information or a control packet can be set to carry out concatenation with another PDCP PDU, although not be set to carry out segmentation.

If the indication information includes transfer information indicating that the PDCP PDU transferred from the PDCP layer is emergency data, the RLC layer can directly transfer the corresponding PDCP PDU to the lower layer without separate data processing procedure. If the indication information includes transfer information indicating that the PDCP PDU transferred from the PDCP layer is non-emergency data, the RLC layer transfers the corresponding PDCP PDU to the lower layer after data processing procedure which is previously set.

If the RLC header addition entity 18 of the RLC layer adds RLC header to the RLC SDU to generate RLC PDU, it can include at least one indicator in the RLC header, wherein the indicator indicates information related with a feature of the corresponding RLC SDU. For example, the indicator can indicate a type of the PDCP PDU included in the RLC PDU, i.e., whether the corresponding PDCP PDU includes a control packet or control information, or a compression packet. Also, if the corresponding PDCP PDU includes a control packet, the indicator can indicate whether the control packet is RoHC feedback information or status report information. For another example, the indicator can indicate whether the RLC SDU included in the corresponding RLC PDU includes information generated in the RLC layer or information related with the PDCP layer. Also, the indicator can indicate whether the RLC SDU included in the corresponding RLC PDU includes information related with PDCP SDU, or information not related with PDCP SDU.

According to another embodiment, if the RLC header addition entity 18 of the RLC layer adds. RLC header to the RLC SDU to generate RLC PDU, it can include an indicator in the RLC header, wherein the indicator indicates information as to whether a sequence number has been included in the corresponding RLC PDU, information as to whether a sequence number has been included in PDCP PDU included in the corresponding RLC PDU, or information as to whether the PDCP PDU included in the corresponding RLC PDU is related with a specific sequence number. For example, the RLC PDU can include an indicator indicating whether the PDCP PDU included in the corresponding RLC PDU is prohibited to carry out segmentation or whether the corresponding PDCP PDU should immediately be transferred to the PDCP layer of the receiving side. For another example, the RLC PDU can include an indicator indicating whether the PDCP PDU included in the corresponding RLC PDU corresponds to a full packet.

The RLC layer of the receiving side can carry out different data processing procedures in accordance with at least one indicator included in the header of the RLC PDU transmitted from the transmitting side. For example, if the at least one indicator indicates that the PDCP PDU included in the corresponding RLC PDU includes control information or a control packet, or indicates that the full packet has been included in the corresponding PDCP PDU, the RLC layer of the receiving side can be set to transfer the corresponding PDCP PDU to the upper layer regardless of the sequence number. Even in case that the at least one indicator indicates that the PDCP PDU included in the corresponding RLC PDU should immediately be transferred to the upper layer, the RLC layer immediately transfers the corresponding PDCP PDU to the upper layer regardless of the sequence number.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method of transmitting and receiving data in the wireless communication system according to the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be applied to a wireless communication system such as a mobile communication system and a wireless Internet system.

The invention claimed is:

1. A method of transferring a data block to a receiving side by a transmitting side in a wireless communication system, the method comprising:
   generating, by a first lower layer having a header compression function, at least one of a control packet and a data packet including at least part of an upper layer data block transferred from an upper layer;
   generating, by the first lower layer, a first lower layer data block including each of the generated at least one packet to transfer the first lower layer data block to a second lower layer lower than the first lower layer, and
   wherein the control packet includes control information not associated with the upper layer data block, and the method comprises:
   transferring first indication information from the first lower layer to the second lower layer, the first indication information indicating whether the first lower layer data block includes the control packet or the data packet;
   transferring first type indication information from the first lower layer to the second lower layer if the first indication information indicates that the first lower layer data block includes the control packet, the first type indication information indicating a type of control packet included in the first lower layer data block;
   generating, by the second lower layer, a second lower layer data block based on at least one of the first indication information and the first type indication information, the second lower layer data block including at least part of the first lower layer data block transferred from the first lower layer;
   transmitting, to the receiving side, second indication information indicating whether the first lower layer data block of which at least part is included in the second lower layer data block includes the control packet or the data packet; and
   transmitting, to the receiving side, second type indication information if the second indication information indicates that the first lower layer data block of which at least part is included in the second lower layer data block includes the control packet, the second type indication information indicating a type of the control packet included in the second lower layer data block.

2. The method of claim 1, wherein the second lower layer determines, based on at least one of the first indication information and the first type indication information, at least one of whether the first lower layer data block can be segmented in the second lower layer and then can be included in different data blocks.

3. The method of claim 1, wherein the second lower layer determines, based on at least one of the first indication information and the first type indication information indicates whether the first lower layer data block can be concatenated with another first lower layer data block and then can be included in one data block.

4. The method of claim 1, wherein the first lower layer transfers to the second lower layer information indicating whether the lower layer data block is emergency data or non-emergency data.

5. The method of claim 1, wherein the first type indication information indicates whether the control packet included in the first lower layer block includes header compression feedback information or status report information,
   wherein the header compression feedback information indicates feedback information for a data block received from the receiving side and the status report information indicates whether a data block transmitted by the receiving side has been successfully received.

6. The method of claim 5, wherein the control packet is generated by an entity which carries out the header compression function.

7. The method of claim 5, wherein the feedback information includes information related with header compression of the data block received from the receiving side.

8. The method of claim 5, wherein the second type indication information indicates whether the control packet included in the second lower layer data block includes the status report information.

9. The method of claim 1, wherein the first indication information and the first type indication information is included in a header of the first lower layer data block and transmitted to the second lower layer.

10. The method of claim 1, wherein the second indication information and the second type indication information is included in a header of the second lower layer data block and transmitted to the receiving side.

11. The method of claim 1, wherein the data packet generated by the first lower layer is a compressed packet generated by the header compression function for the upper layer data block.

12. The method of claim 1, wherein the first lower layer ciphers the data packet including at least part of the upper layer data block and adds the first indication information to the ciphered data packet to generate the first lower layer data block, and transfers the first lower layer data block including the ciphered data packet to the second lower layer; and
   the first lower layer does not cipher the control packet and adds the first and second indication information to the control packet to generate the first lower layer data block including the un-ciphered control packet, and transfers the first lower layer data block including the un-ciphered control packet to the second lower layer.

* * * * *